United States Patent
Vincent

(10) Patent No.: US 6,523,269 B1
(45) Date of Patent: Feb. 25, 2003

(54) APPARATUS AND METHOD FOR ROUTING RADII AND DRAWING FULL-SCALE LAYOUTS

(76) Inventor: Loren Jay Vincent, 3812 Camerino St., Lakewood, CA (US) 90712

( * ) Notice: Subject to any disclaimer, the term of this patent is extended or adjusted under 35 U.S.C. 154(b) by 0 days.

(21) Appl. No.: 09/718,834
(22) Filed: Nov. 22, 2000
(51) Int. Cl.$^7$ .................................................. B43L 9/00
(52) U.S. Cl. ..................... 33/27.01; 33/27.03; 33/27.04
(58) Field of Search ........................... 33/27.01, 27.04, 33/27.02, 27.03, 27.031, 18.1, 628, 27.06, 27.033, 27.05, 27.12, 30.3, 30.6, 23.08

(56) References Cited

U.S. PATENT DOCUMENTS

| | | | | |
|---|---|---|---|---|
| 324,395 A | * | 8/1885 | Marichal | 33/30.2 |
| 465,264 A | * | 12/1891 | Hare | 33/27.12 |
| 1,904,109 A | * | 4/1933 | Wendorf | 144/136.1 |
| 3,292,262 A | * | 12/1966 | Moll | 33/27.03 |
| 3,393,453 A | | 7/1968 | Stoneman | |
| 3,430,347 A | | 3/1969 | Minniear | |
| 3,858,630 A | * | 1/1975 | Cherry et al. | 144/144 |
| 4,324,514 A | * | 4/1982 | Craven | 33/23.11 |
| 4,343,094 A | * | 8/1982 | Ubezio | 33/27.03 |
| 4,446,768 A | * | 5/1984 | Sirmans | 33/26 |
| 4,630,657 A | * | 12/1986 | Obradovich | 144/144.5 |
| 4,685,496 A | | 8/1987 | Livick | |
| 4,911,214 A | | 3/1990 | Scott | |
| 5,038,841 A | | 8/1991 | Larmon | |
| 5,161,592 A | | 11/1992 | Rasmussen | |
| 5,486,076 A | | 1/1996 | Hauschopp | |

FOREIGN PATENT DOCUMENTS

DE    004220004 A1    12/1993

* cited by examiner

Primary Examiner—Diego Gutierrez
Assistant Examiner—Mirellys Jagan
(74) Attorney, Agent, or Firm—Knobbe, Martens, Olson & Bear LLP

(57) ABSTRACT

An apparatus and method for routing radii and for producing full-scale layouts is disclosed. The apparatus consists of a guide of smaller radius than the work, a carriage adapted to trace the guide, and a trammel adjustably extending from the carriage. The trammel is adapted to mount a tool for performing the work at the desired radius. The trammel extension corresponds to the difference between the radius of the work and the radius of the guide. The apparatus thus provides a simple method for working with large radius work pieces within confined spaces. Further, the device is usable by one worker and produces accurate results. Finally, the device is inexpensive to produce and may be adjusted to work with virtually any size radius.

20 Claims, 6 Drawing Sheets

APPARATUS AND METHOD FOR ROUTING RADII AND DRAWING FULL-SCALE LAYOUTS

BACKGROUND OF THE INVENTION

1. Field of the Invention

The invention relates to woodworking tools generally. In particular the invention provides an inexpensive device and method for working within a confined space to accurately rout curved work pieces of large radius. The invention may also be used to draw full-scale layouts.

2. Description of the Related Art

Methods of routing curved work pieces and of producing full-scale layouts are well known. However, when working with large radii these methods are either inconvenient because they require a large work space and waste a great deal of material, or very expensive.

One method for routing at large radii is to use a CNC (Computer Numerical Control) machine. This type of machine is capable of working with pieces of very large radius while producing very accurate results. The principal drawback to this machine however is that it is very expensive, costing upwards of $100,000. Furthermore, farming the work out to a bigger shop that owns a CNC machine is also prohibitively expensive, costing $200 or more depending on the size and type of the order. Due to the nature of the construction industry, where work projects are awarded to the lowest bidder, it is critical to keep costs down as much as possible. A subcontractor who uses a CNC machine often will not be the low bidder.

An inexpensive method of both routing at large radii and producing full-scale layouts is to use a trammel. This device is simply a long arm that is rotatably fixed at one end and adapted to mount a router or marking instrument on the other end. U.S. Pat. Nos. 4,685,496 and 5,486,076 disclose trammels for mounting a router. The length of the trammel arm corresponds to the radius of the work piece. The trammel is pivotally secured at a point on the trammel spaced from the router, and the trammel acts as a guide to allow the router to trace a circumference on the work piece.

This method has a number of drawbacks. First, because the trammel arm must be the same length as the radius of the work piece, very large work spaces are needed to work with the trammel when routing large radii. Floor space in a workshop is of course very valuable. Therefore it is not practical for most shops to devote a large section of the shop floor to routing large radius pieces. Nor is it practical for the shop to spend the time necessary to clear an area for this operation. The space is better suited for ongoing projects.

Second, constructing a long trammel requires a great deal of material and requires a significant number of man-hours. Furthermore, trammels of various lengths must be built to meet the needs of each job. If a new trammel is to be built for each job, a significant cost in materials and man-hours must be absorbed. Conversely, if a number of trammels of different lengths are to be built and stored for future use, costs in wasted storage space arise.

Third, trammels over twenty feet long require two workers to operate, and the results are generally of poor quality. Long trammels tend to flex during operation, which results in flat spots being formed along the circumference of the work piece.

Trammels may also be used to produce full-scale layouts. However, the same difficulties described above in connection with routing must be overcome. Another known method of producing full-scale layouts that solves these problems is to use a computer and CAD (computer-aided design) software. The layout is drawn on the computer screen and then put on paper using a plotter. This method produces very high quality results, but requires a large and expensive investment to purchase the necessary hardware and software.

U.S. Pat. No. 3,393,453 discloses a device for scribing large radii on layouts that overcomes some of the problems outlined above in connection with trammels. The device uses a trammel in combination with a template to produce large radii without the need to use a correspondingly large trammel.

The device of the '453 patent suffers from three principal drawbacks. First, the template is not adapted to be secured to a work surface during use. The operator must hold the template in place, where it is obviously prone to shift and produce poor quality arcs.

Second, the device may only be used to produce a limited range of arc radii, depending on what size templates are available. The carriage is adapted to ride on only a specific type of template, and this template is not readily producible by the average person.

Third, the invention may only be used to draw layouts. The trammel is not adapted to mount a router or other power tool.

Therefore, a device and method of routing at large radii and producing full-scale layouts that is inexpensive, easy for one person to use, and produces high quality results would be of great benefit in the woodworking industry.

SUMMARY OF THE INVENTION

The invention provides an apparatus and method for routing radii and for producing full scale layouts. The device is particularly well-adapted to work with large radii, because it is usable within confined spaces and requires only one person to operate, but produces exceptional results.

The device comprises a plurality of guides, a carriage assembly and an adjustable trammel arm. The guide is a curved section of material that is secured to a flat work surface. The radius of the guide is determined by the radius of the work piece, as discussed below. In operation, the guide steers the carriage as the carriage travels along a length of the guide.

The carriage assembly comprises a substantially rectangular support frame with four rotating members on its underside. The rotating members provide a low-friction interface between the guide and carriage as the carriage rides from one end of the guide to the other.

The trammel arm is adjustably secured to the carriage so that it defines an extension of the guide radius. In this orientation, the trammel is adjustable so that the sum of the trammel extension and the guide radius is equal to the radius of the work piece or layout. The end of the trammel opposite the carriage is adapted to mount a router for cutting or a marking instrument for drawing. Other types of power tools may be mounted to the trammel arm, such as jigsaws or circular saws, but routers are preferred to produce the highest quality finished product.

To practice the method of using the apparatus, first an appropriately sized guide is secured to the work surface. Second, the carriage is positioned atop the guide and secured in place. Third, a router or marking instrument is secured to the trammel. Fourth, the work piece or layout is secured to the work surface at the appropriate distance from the guide.

Fifth, measurements are made and the trammel arm is adjusted to the appropriate length and secured into place. Finally, the arc is drawn or the work piece is routed by moving the carriage along the guide.

DETAILED DESCRIPTION OF THE PREFERRED EMBODIMENTS

Figure 1:
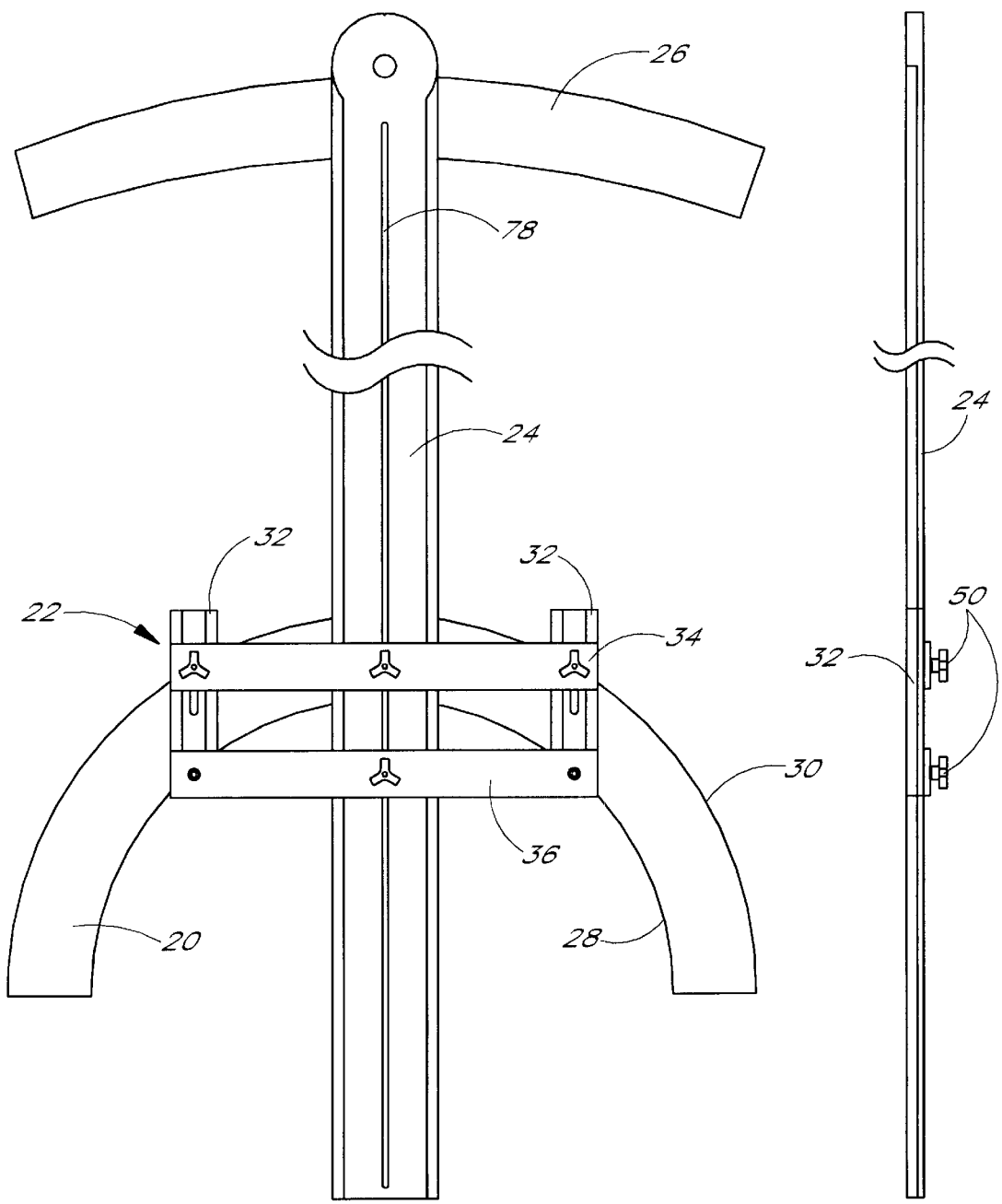
FIG. 1A is a plan view of a preferred embodiment the device for routing radii and producing full-scale layouts according to the present invention.
FIG. 1B is a side elevation view of the device.
FIG. 1C is a rear elevation view of the device.
Figures 2, 3:
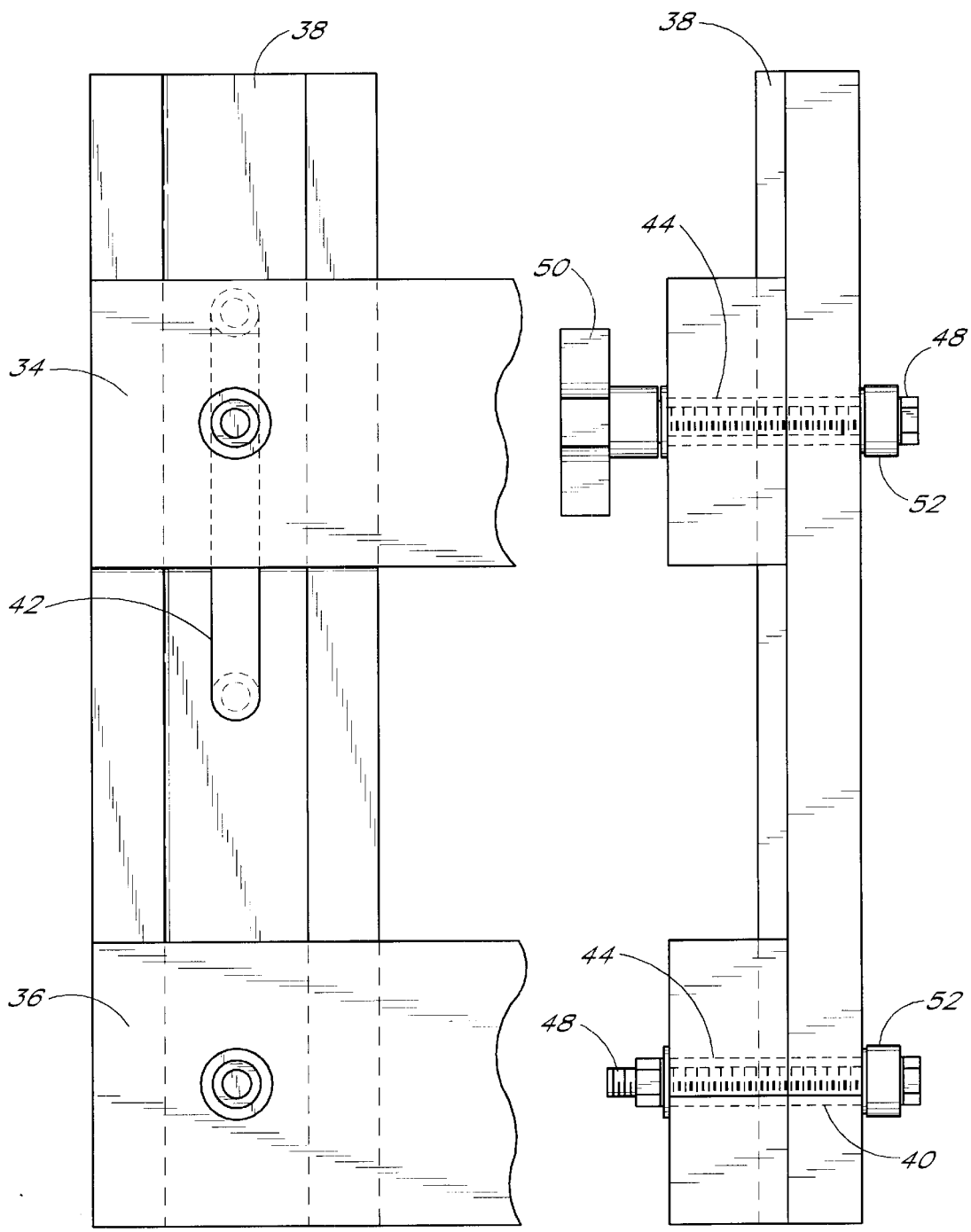
FIG. 2 is a detail view of the carriage arm assembly from a top perspective.
FIG. 3 is a detail view of the carriage arm assembly from a side perspective.

Referring to FIGS. 1A–C the invention comprises three major components: a guide 20, a carriage assembly 22 that traces the guide 20, and a trammel 24, which is connected to the carriage 22 and extends from the guide 20 to the work piece 26.

The guide 20 is an arc-shaped strip of material, preferably wood, that is well adapted to be firmly secured to a flat work surface. The guide 20 has a concave edge 28 and a convex edge 30 that define concentric arcs. The edges 28, 30 guide the carriage 22, which rides over the guide 20 as the work is performed.

Figure 4:
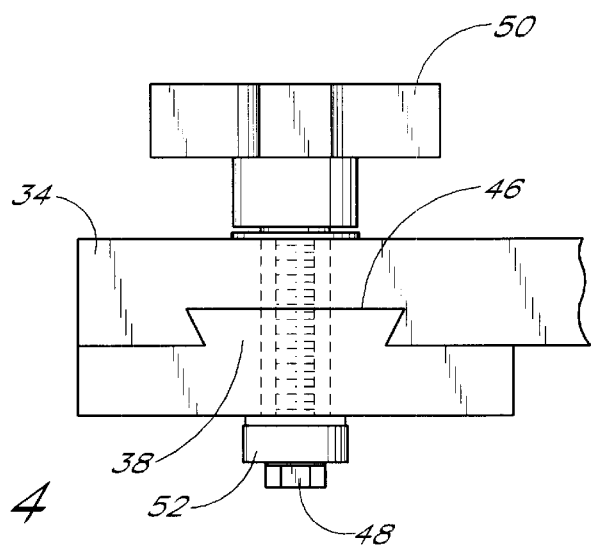
FIG. 4 is a detail view of the front left portion of the carriage arm and adjustable runner from a front perspective.
Figure 6:
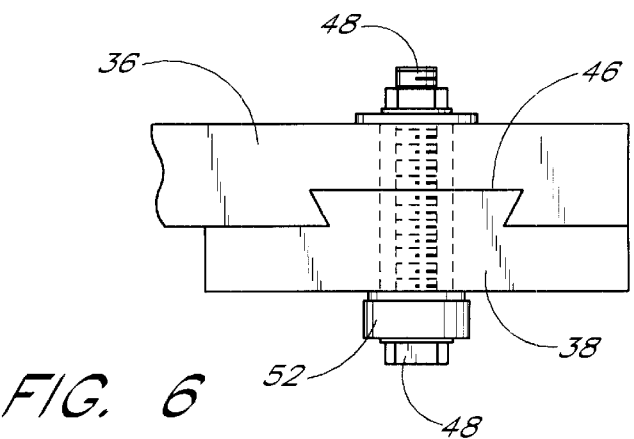
FIG. 6 is a detail view of the right rear portion of the carriage arm and fixed runner from a front perspective.
Figures 7, 8:
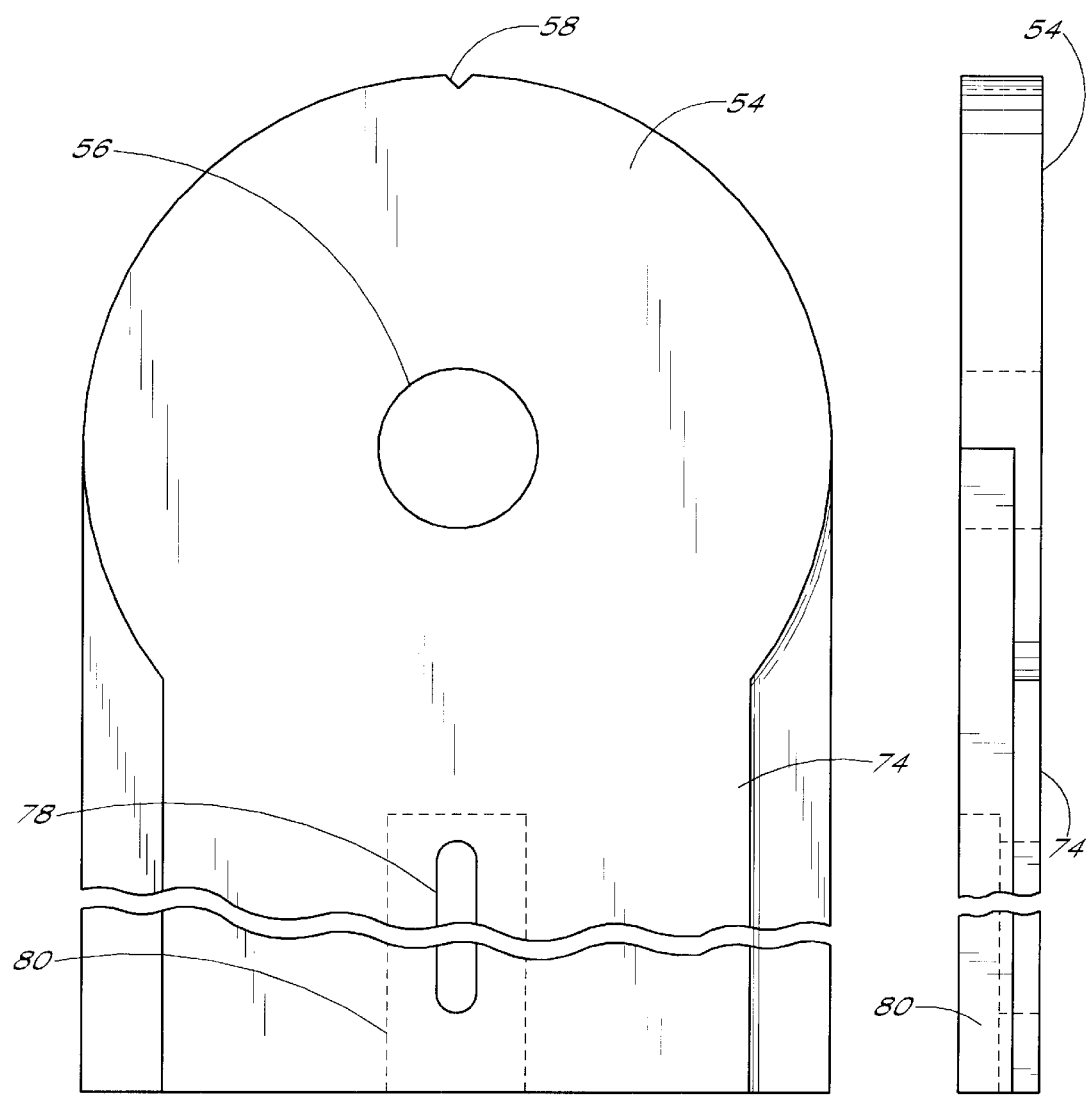
FIG. 7 is a detail plan view of the router end of the trammel arm.
FIG. 8 is a detail side elevation view of the router end of the trammel arm.

The carriage 22 consists of two parallel arms 32 connected to one another by two parallel runners 34, 36. The arms 32 are shown in detail in FIGS. 2–4, and 6. The upper surface of each arm 32 is shaped as a dovetail tab 38 (FIGS. 4 and 6). Each arm 32 contains a through-bore 40 near one end. An elongate through-slot 42 extends along a length of the longitudinal axis of the arm 32 from a point spaced from the bore 40.

Figure 5:
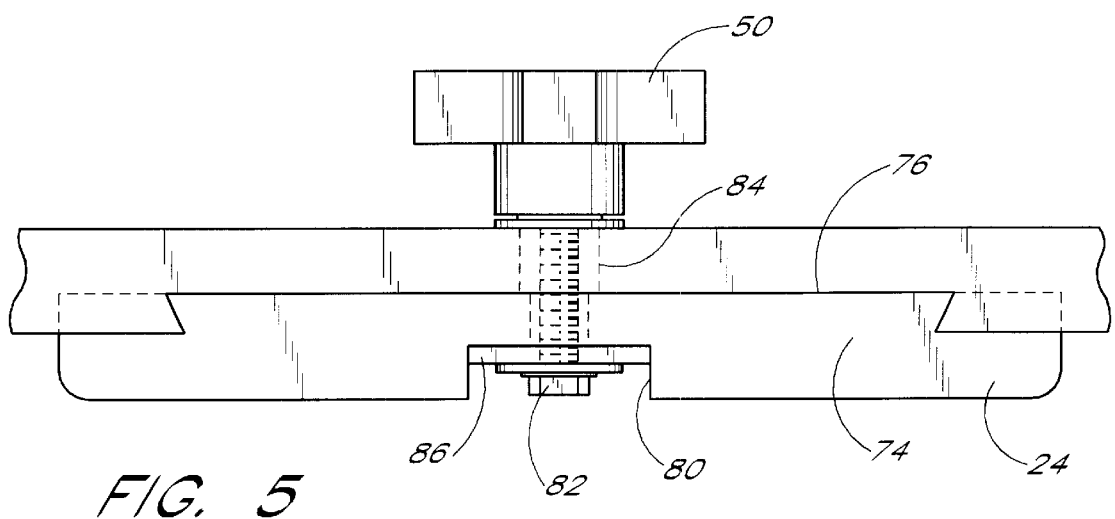
FIG. 5 is a detail view of the trammel arm and fixed runner from a front perspective.

The runners 34, 36 are shown in detail in FIGS. 2–6. Each runner 34, 36 contains three through-bores 44, one near each end and one near the center. The bores 44, are illustrated in FIGS. 4–6. Also near each end, each runner 34, 36 has a dovetail slot 46 (FIGS. 4 and 6) adapted to mate with the dovetail tab 38 of each arm 32. The dovetail slot 46 at each end of the rear runner 36 slidably engages the dovetail tab 38 of one arm 32, and is secured to the arm 32 with a threaded member 48, preferably a bolt, that extends through an end bore 44 in the runner 36 and through the bore 40 on one end of the arm 32. Thus, the relative positions of the arms 32 and the rear runner 36 remain fixed.

The dovetail slot 46 at each end of the forward runner 34 also slidably engages the dovetail tab 38 of one arm 32 and is secured to the arm 32 with a threaded member 48 that extends through the end bore 44 in the runner 34. These members 48 extend through the elongate slot 42 running along the longitudinal axis of each arm 32 and engage internally threaded knobs 50. Thus, the forward runner 34 may be moved forward and backward along a length of the arms 32, and secured in a desired position by tightening the knobs 50 down on the threaded members 48.

It will be understood by one of skill in the art that the arms 32 and runners 34, 36 need not be secured to one another using dovetail joints. Simply using threaded fasteners, as shown, without the dovetail joints would also be effective. The dovetail joints, however, provide the overall assembly with greater stability, and are the preferred construction.

Rotatable members 52 are disposed on the threaded members 48 beneath the carriage arms 32. These rotatable members 52 aid the movement of the carriage 22 along the guide 20 as the work is performed. Any type of substantially cylindrical part with a central bore is suitable for this member 52, but precision bearings are preferred.

The trammel 24, preferably constructed of wood, aluminum or plexiglass, comprises an elongate arm having a square end near the guide 20, and a rounded end near the work piece 26. The rounded end consists of a circular platform 54 containing a central through-bore 56, as shown in detail in FIGS. 7–8, 10A–B. The platform 54 is configured to support a router (not shown) such that the cutter extends through the bore 56. A V-shaped notch 58 on the edge of the platform provides a convenient point to retain a marking instrument when the device is used to draw full-scale layouts.

Figure 10A:
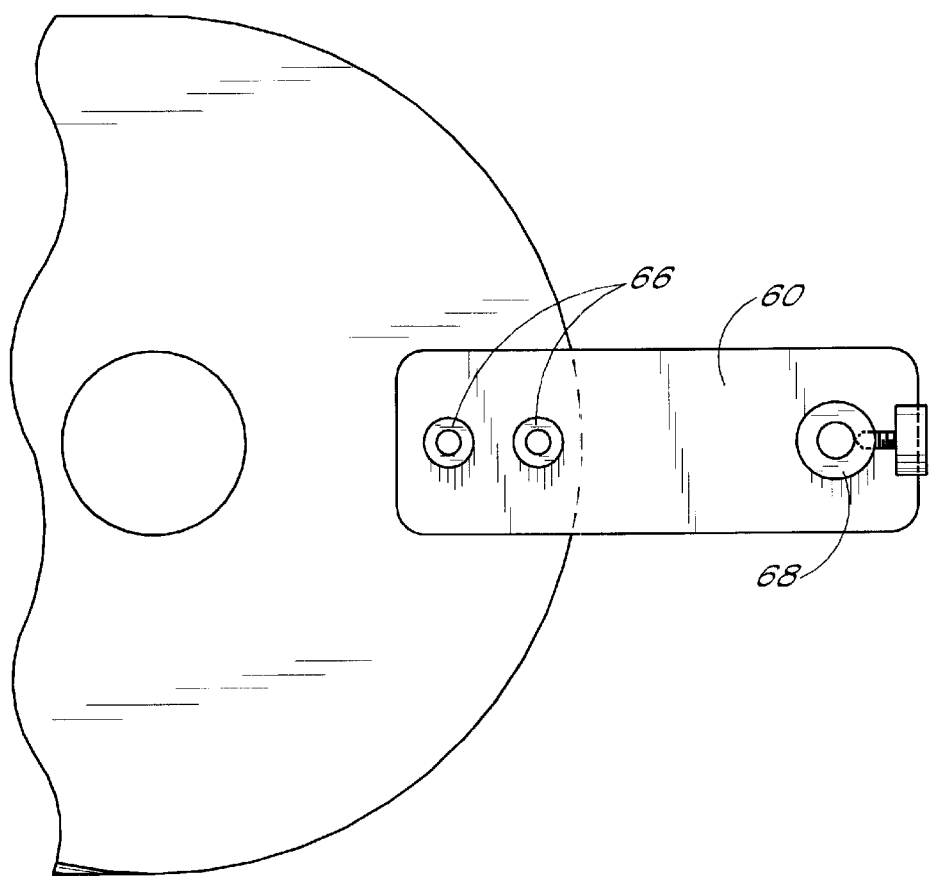
FIG. 10A is a detail plan view of the router end of the trammel arm, illustrating an alternative configuration for mounting a marking instrument.
Figure 10B:
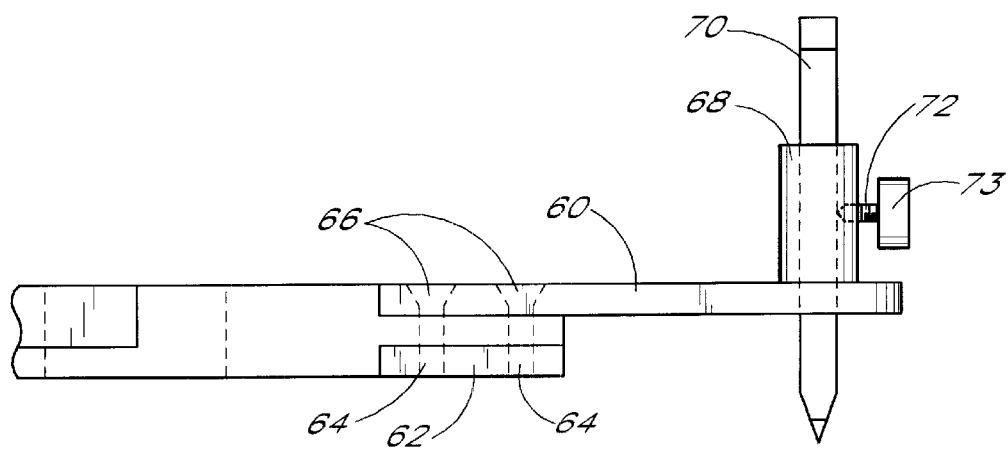
FIG. 10B is a detail cross-sectional view of the router end of the trammel arm, illustrating an alternative configuration for mounting a marking instrument.

A second preferred embodiment, shown in FIGS. 10A–B, provides an alternative configuration for mounting the marking instrument on the edge of the circular platform. This configuration includes an extension member 60, which is preferably constructed of aluminum bar stock. In order to maintain the flat surface of the circular platform 54, the extension member 60 sits in a channel carved in the upper surface of the platform 54. A similarly shaped channel in the lower surface houses a plate 62 having two threaded holes 64. The extension member 60 is mounted to the platform 54 with two flat head screws 66 that extend through bores in the extension member and into the plate 62, with a section of the platform 54 sandwiched in between. Other means of fastening the extension member 60 to the trammel, such as nails, rivets, adhesive, cooperating joints, etc., would also be effective.

A vertical cylinder 68 is mounted to the far end of the extension member 60. The cylinder 68 includes an externally threaded extension that engages an internally threaded bore in the extension member 60. The cylinder 68 includes a central through bore that is sized to accept a standard writing utensil 70, such as a #2 pencil. A threaded pin 72 that penetrates the side wall of the cylinder 68 engages the writing utensil 70 and maintains its position within the cylinder 68. The pin 72 includes a knurled knob 73 to facilitate hand-tightening of the pin 72.

A dovetail tab 74 extends along the upper surface of the trammel 24 from the edge of the circular platform 54 to the square end. This tab 74 is adapted to mate with dovetail slots 76 disposed on the undersides of the runners 34, 36, near their centers. A slot 78 extends along the trammel's longitudinal axis of symmetry from near the guide 20 end to near the work end. A dado 80 extends along the length of the trammel 24 underside.

The trammel 24 is secured to the carriage 22 with threaded fasteners 82. The fasteners 82 extend through the trammel slot 78 and the central bores 84 in the runners 34, 36. In order to protect the wood on the underside of the trammel 24, a slider 86, adapted to fit within the dado 80 provides a buffer between the threaded fasteners 82 and the trammel 24.

Figure 9A:
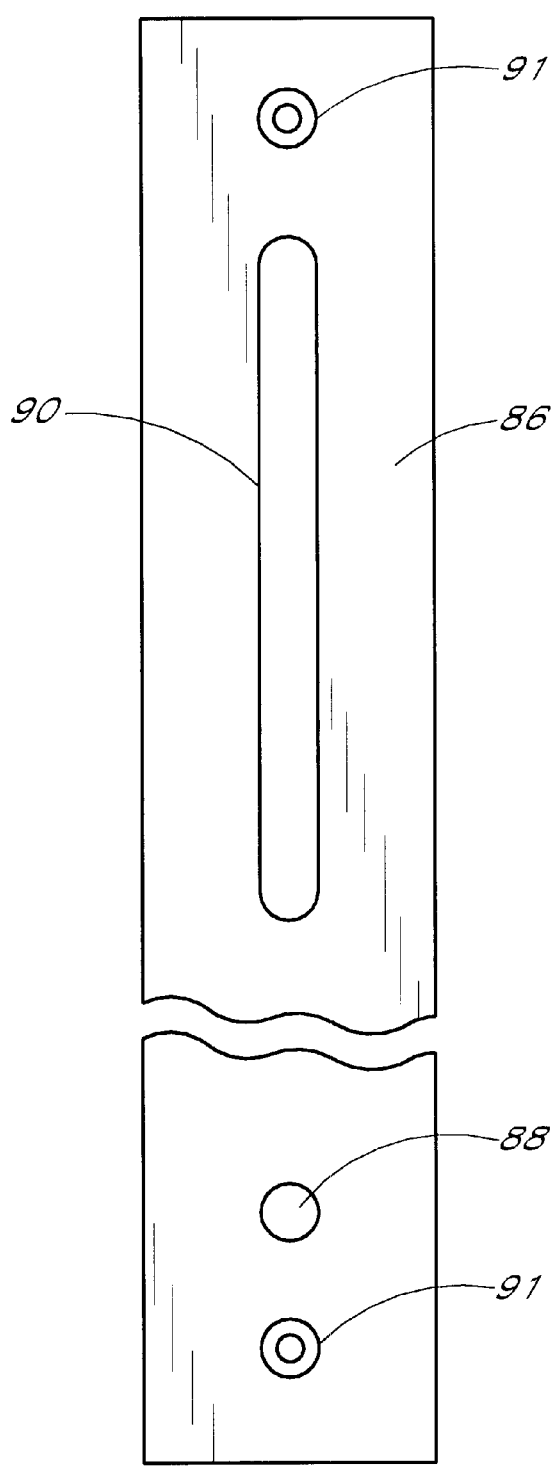
FIG. 9A is a plan view of the slider.
Figure 9B:
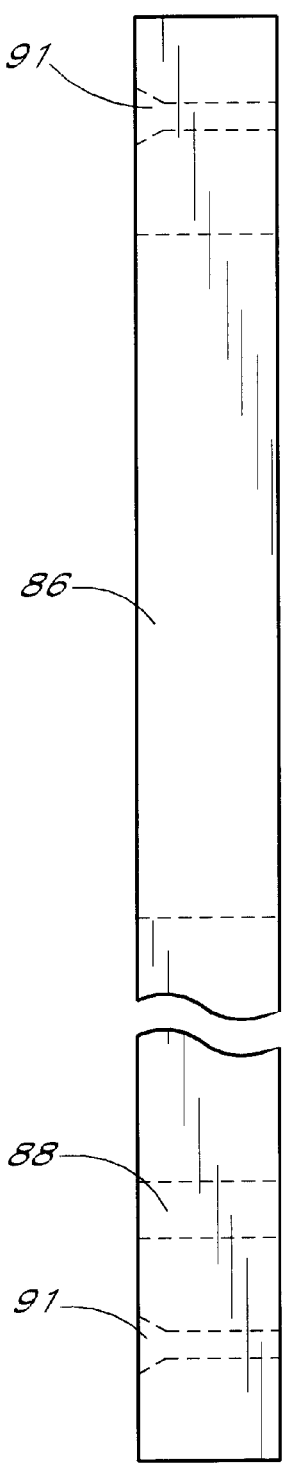
FIG. 9B is a side elevation view of the slider.

The slider 86, shown in detail in FIGS. 9A–B, is preferably constructed of aluminum or steel, or other durable material that slides easily against the wood surface of the trammel 24. A bore 88 engages the threaded fastener 82 that is secured to the fixed runner 36. An elongate through-slot 90 engages the fastener 82 that is secured to the adjustable runner 34. The slider 86 also includes two countersunk holes 91, one near each end. The holes 91 are used when relatively short radii are to be cut or drawn, as explained below.

Although FIG. 5 depicts the threaded fastener 82 as a bolt extending upward into an internally threaded 3-star knob 50, alternatively a 3-star knob having an externally threaded extension may be provided. The threads would be adapted to engage internal threads provided on the slider, or an internally threaded nut disposed on the underside of the slider. Other alternatives are also possible, as one of skill in the art will understand.

To rout a work piece 26 using the invention, first a guide 20 is secured to the work surface. Since the same work surface will ideally be used to rout many work pieces 26, and guides 20 will ideally be reusable, the guide 20 should be secured in such a way that it may easily be removed without damaging the guide 20 or the work surface. Screws are preferred. The radius of the guide 20 is determined by the radius of the work piece 26 to be routed, as explained below.

Next, the knobs 50 on the threaded fasteners 48, 82 are loosened to enable free sliding movement of the adjustable runner 34 and the trammel 24. The carriage assembly 22 is placed over the guide 20 such that the rotatable members 52 of the fixed runner 36 are on the concave side 28 of the guide 20 and the rotatable members 52 of the adjustable runner 34 are on the convex side 30 of the guide 20. The fixed rotatable members 52 are then pressed against the concave side 28 of the guide 20 while the adjustable runner 34 is slid towards the opposite side of the guide 20 until all four rotatable members 52 are in firm contact with the guide 20. To secure the rotatable members 52 in this position, the knobs 50 on the threaded members 48 joining the adjustable runner 34 and the arms 32 are tightened.

Next the work piece 26 is secured to the work surface at an appropriate distance from the guide 20. For example, if the work piece 26 is an arc having a 30' radius, and a 25' radius guide 20 is used, the work piece 26 must be placed so that the router blade will engage the work piece 26 and the 30' radius cut will be made at the desired position on the work piece 26. 5' from the convex edge 30 of the guide 20 would determine this position. In order for the router to trace the edge of the work piece 26, the work piece 26 must be placed on the work surface in an orientation such that the guide 20 and work piece 26 define concentric arcs.

The work piece 26 is secured by any appropriate means to prevent undesirable damage to the finished piece. If the final product is to be cut from a larger work piece 26, screws may be used to secure the work piece 26 onto the work surface by positioning the screws in a part of the work piece 26 that is to be discarded. Care must be taken to ensure that the screws, or other suitable fasteners, are not in the path of the router blade.

Next, the trammel arm 24 is adjusted to the appropriate length to allow the router blade to trace the desired radius. For example, assume that the work piece 26 is a rectangular sheet of plywood from which a 5" wide, 20' radius arc is to be cut. A 15' radius guide 20 may be selected, so that 5' of trammel 24 extension is needed. Measuring from the convex side 30 of the guide 20, a pencil mark is placed at 55" from the guide 20. A second mark is placed at 60" from the guide 20. Sliding the trammel arm 24 outward, the router is positioned to that the cutting blade touches the inside of the 55" mark. The two knobs 50 on the trammel 24 are tightened to secure the router in this position. The 55" arc is then routed by making two passes. Finally, the router is repositioned so that the cutting blade touches the outside of the 60" mark and routing proceeds as described. Care must be taken so that the rotatable members 52 do not disengage the guide 20 when beginning and ending cuts.

Following the steps just described, pieces of radius from zero to near infinity may be produced by simply using an appropriately sized guide 20. Beginning with only guides 20 of small radius, guides 20 of progressively larger and larger radius are produced using the invention until the required radius is reached. Guides in increments of 7', such as 7', 14', 21', etc., are preferred. As each work piece 26 is cut, it then is used as the guide 20 to make the next larger guide 20. Additionally, small radii may be produced using the invention by simply reorienting the carriage 22 so that the trammel 24 projects from the concave edge 28 of the guide 20.

If relatively short radii (shorter than the overall length of the trammel 24) are to be cut or drawn, the guide 20 and carriage 22 may be removed so that the trammel 24 may be used on its own to trace the desired radius. After removing the guide 20 and carriage 22, a screw is driven through one of the countersunk holes 91 in the slider 86 to rotatably secure the trammel 24 directly to the work surface. Measurements are then made from the center of the countersunk hole 91 to the work piece 26, and the knobs 50 are tightened to lock the trammel 24 at the desired extension. Operation of the invention then proceeds as described above.

To use the invention to draw full-scale layouts, the router is replaced with a marking instrument. The steps outlined above are then followed with appropriate adjustments.

The invention provides a device that is versatile, easy to use, and produces high quality results. The trammel 24 is adapted to mount various tools, from a simple marking instrument to a power router. Because the invention uses a trammel arm 24 that is significantly shorter than the radius to be cut or drawn, one worker may operate the device with ease. The shorter length of the trammel 24 also helps reduce flex, which boosts the quality of the finished product by removing flat spots from the curve. The securely fastened guide 20 also increases quality by preventing shifting of the carriage 22 during operation. Because an operator using the invention may easily produce guides 20 of progressively larger and larger radius, the device may be used to work with pieces having a virtually infinite range of radii.

The above presents a description of the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A device for tracing an arc, comprising:
   an arcuate guide;
   a carriage having first and second arms and first and second runners, wherein the first runner is fixedly secured to the arms and the second runner is slidably secured to the arms; and
   a trammel slidably secured to the runners;
   wherein the trammel follows an arc as the carriage is moved along the arcuate guide.

2. The device according to claim 1, wherein the guide comprises a rigid arc adapted to be secured to a work surface, the arc having a concave edge and a convex edge.

3. The device according to claim 1, further comprising a router mounted to the trammel.

4. The device according to claim 1, further comprising a marking instrument mounted to the trammel.

5. The device according to claim 1, wherein the first and second arms comprise a surface having a male component of a dovetail joint from a first end to a second end along a longitudinal axis of the arm.

6. The device according to claim 5, wherein the first and second arms further comprise a circular bore near the first end and a slot along the longitudinal axis of the arm and spaced from the bore.

7. The device according to claim 1, wherein the first and second runners comprise a surface having at least one female component of a dovetail joint from a first side to a second side in a direction perpendicular to the longitudinal axis of the runners.

8. The device according to claim 7, wherein the first and second runners comprise a through-bore near a first end, a through-bore near a second end, and a through-bore near the center of the first and second ends.

9. The device according to claim 1, wherein the arms, runners and trammel are secured to one another with elongate threaded fasteners.

10. The device according to claim 9, further comprising rotatable members attached to at least one of the threaded fasteners.

11. The device according to claim 1, wherein the trammel comprises a substantially circular platform at a first end.

12. The device according to claim 11, wherein the platform comprises a substantially bar shaped extension having a vertical cylinder configured to accept a marking instrument.

13. The device according to claim 11, wherein the platform has an indentation along its edge for locating a marking instrument.

14. The device according to claim 13, wherein the platform has a central through-bore.

15. The device according to claim 14, wherein the trammel comprises a first surface having a male component of a dovetail joint from the near edge of the platform to a second end.

16. The device according to claim 15, wherein the trammel comprises a through-slot along its longitudinal axis from near the second end to near the circular platform.

17. The device according to claim 16, wherein the trammel comprises a second surface opposite the first surface having a dado along its longitudinal axis from the second end to near the circular platform.

18. The device according to claim 17, further comprising an elongate slider adapted to slide within the dado.

19. A method of routing large radii, comprising the steps of:
   providing a device according to claim 1;
   mounting a router to the trammel;
   providing a work piece;
   securing the guide to a work surface;
   securing the work piece to the work surface, such that the work piece and guide define concentric arcs;
   adjusting an extension of the trammel from the carriage so that the router traces the desired radius; and
   routing the work piece by moving the carriage along a length of the guide.

20. A method of drawing a radius within a full-scale layout, comprising the steps of:
   providing a device according to claim 1;
   mounting a marking instrument to the trammel;
   providing an incomplete layout to be marked;
   securing the guide to a work surface;
   securing the layout to the work surface;
   adjusting an extension of the trammel from the carriage so that the marking instrument traces the desired radius; and
   marking the layout by moving the carriage along a length of the guide.

* * * * *